United States Patent

[11] 3,632,196

[72] Inventor Armand L. De Pizzol
Greenbrae, Calif.
[21] Appl. No. 863,660
[22] Filed Oct. 3, 1969
[45] Patented Jan. 4, 1972
[73] Assignee I-Info Corporation

[54] INFORMATION INDEXING AND RETRIEVAL SYSTEM AND APPARATUS
4 Claims, 6 Drawing Figs.
[52] U.S. Cl. .................................................... 353/27,
353/25, 340/149 A
[51] Int. Cl. ...................................................... G03b 23/08,
H04q 3/70
[50] Field of Search .......................................... 353/25, 27;
340/149 A; 235/61.7 B

[56] References Cited
UNITED STATES PATENTS
3,039,582   6/1962   Simjian.......................... 194/4
3,184,714   5/1965   Brown et al................... 340/149
3,244,067   4/1966   Jonker et al. ................. 353/27
3,512,130   5/1970   Hulett............................ 40/2.2

Primary Examiner—Leonard Forman
Assistant Examiner—Steven L. Stephan
Attorney—Warren, Rubin, Brucker & Chickering ABSTRACT: An information storage and retrieval system and apparatus therefor are disclosed which preferably includes, a microfilm storage media with information pieces recorded on such media at predetermined locations, and a plurality of retrieval cards, each formed to be superimposed over the film in indexed relation thereto and each formed with an opening in the body thereof in a location in each such card so that information stored in the film which relates to the particular card used is located by the opening in the card upon superimposition with the film. Indicia may be provided on the cards to assist in location of the information piece relating to each card. Alternate card and film constructions as well as magnification and display apparatus for retrieval of information stored on the microfilm are provided.

INVENTOR.
Armand L. De Pizzol
BY Warren, Rubin,
Brucker & Chickering
Attorneys

INVENTOR.
Armand L. De Pizzol
BY Warren, Rubin,
Brucker & Chickering
Attorneys

INFORMATION INDEXING AND RETRIEVAL SYSTEM AND APPARATUS

BACKGROUND OF THE INVENTION

The information indexing and retrieval system of the present invention relates in general to systems for storing and selectively retrieving pieces of information, and more particularly, relates to systems for the verification of documents such as credit cards, checks, licenses, permits and the like as to their ownership, credit standing or related information.

In many business situations commonly encountered in today's economy there exists a need for verifying the accuracy of documents or instruments of commerce. A well-known example is the problem of determining whether or not to extend credit to a credit card holder. Under present practices millions of dollars are lost each year as a result of the fraudulent use of lost or stolen credit cards. Another serious problem in the extension of credit which commonly occurs is the credit card holder's excessive use of his credit privilege. Thus, once a credit card is placed in the debtor's hands, he may use the card so extensively as to go beyond the limit of the credit which the lending institution is willing to lend.

The problems encountered in controlling the use of credit cards apply in many other situations. For example, problems in cashing checks can be quite similar. Moreover, the verification of a license, permit or identification card may create analogous problems. Most of these problems are further complicated by the fact that verification of identity, credit limits, etc., must be accomplished at a point which is remote from the card issuing authority or central clearing house of information with regard to the document or instrument involved. For example, when a credit card is lost or stolen and reported to the lender, the central branch of the lender must disseminate this information to the many remote areas in which the credit card may be used. While it is possible for each remote area to check with the central area on each transaction, this approach is highly time consuming and expensive and would tend to defeat the convenience advantage attendant to the use of credit cards. Accordingly, it is present practice merely to accept a certain percentage loss as part of the operation of a credit card system.

One approach to the solution of the above noted problems has been through the use of document verification systems which include the comparison of signatures, photographs or fingerprints. Such systems have been used with varying degrees of success. They do not afford, however, the advantages which accrue from being able to retrieve information other than the identification of the instrument holder. Another approach has been to employ a computer with remote terminals. This approach certainly has the advantage of having an almost unlimited amount of information which may be rapidly retrieved and considered at remote areas. The cost of operation of such a system, however, becomes prohibitive as the number of remote areas increases.

Recent developments in the recording of information on microfilm have resulted in a significant improvement of microfilm as a storage media for information. Early microfilm had a capability of reducing information at a reduction ratio of about 10 to one. Subsequently processes have been evolved in which reduction of as high as 150 to one have achieved. This high-reduction microfilm is generally referred to as microfiche (when the reduction ratio is in excess of about 100 to one the microfiche is also referred to as HR-fiche) and that term will be used throughout this application to describe microfilms having a relatively high-reduction ratio.

While this new increase in the storage capacity of microfilm created obvious advantages, the rapid retrieval of information remained a problem. Most microfilm readers scan successive characters or pieces of information placed on the microfilm. Thus, in a manner similar to computers using tapes, it was necessary to scan a very substantial mass of information prior to retrieving the predetermined information bit. While this problem can be overcome by the use of sophisticated and high speed equipment, it is not readily solved in an inexpensive manner which is suitable for widespread use.

Accordingly, it is an object of the present invention to provide a system and apparatus for the storage and retrieval of selected pieces of information by means of inexpensive equipment which can be operated by nontechnical personnel at a large number of separate locations.

It is also an object of the present invention to provide an information storage and retrieval system which is easily and inexpensively updatable in order that the users of this system remote from the central information clearing house may be kept constantly up to date.

It is further an object of the present invention to provide an information storage and retrieval apparatus and system which will allow the rapid verification of a variety of types of instruments and the retrieval of information relative to very large numbers of such instruments.

It is another object of the present invention to provide an information storage and retrieval system which is compact, easy to manufacture and use, and may be easily adapted for use with existing commercially used instruments and documents.

SUMMARY OF THE INVENTION

The information storage and retrieval system of the present invention is comprised, briefly, of an information storage medium on which information pieces are distributed in predetermined fixed locations, and an information retrieval card formed for indexing relative to the storage medium, the card being further formed with a locator means formed and positioned in the card in order to allow isolated consideration and retrieval of information from a predetermined portion of the storage medium. The storage medium is preferably microfilm on which a multiplicity of characters or information pieces are positioned. The card preferably includes an opening or marking physically positioned on the card so as to be superimposed over a predetermined area of the film when the card and film are placed in indexed relation. If credit cards with openings therein are used, the peripheral edge of the credit card may be used to index the card relative to a microfiche film, and the openings on any card may be varied slightly over the area of the card in order to direct the user to different areas of the microfiche which correspond to the different cards. The limited area confined by the locator opening can then be magnified for ease of reading, and the information on the microfiche can be displayed.

DESCRIPTION OF THE PREFERRED EMBODIMENTS

Referring to FIGS. 1–4, a typical retrieval card and storage medium constructed in accordance with the present invention are illustrated. The retrieval card, generally designated 21, is here illustrated as a national credit card of the type typically distributed by oil companies, banks and large department stores. Credit card 21 is formed in a standard manner having a card body 22 on which such information as the name of the card holder and the company which issued the card appears. Typically these cards also have certain terms and conditions inscribed on the back side thereof. In addition, the card body is preferably formed from a plastic material such as polyvinyl chloride which may have the card holder's name embossed thereon as well as coded indicia generally designated 23 also embossed on the card. As thus far described, the retrieval card has the same construction as the standard credit card. As will also be appreciated, other information may be embossed or printed upon the card such as the date through which the card may be used.

Figure 2:
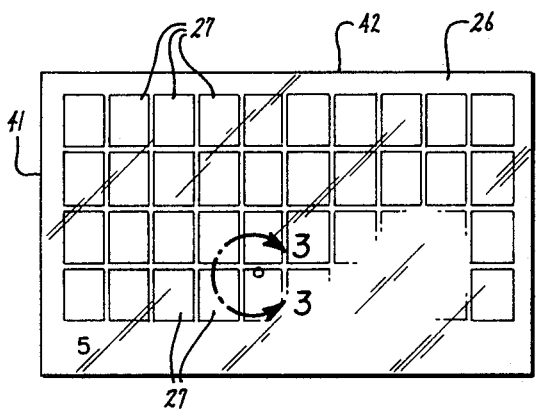
FIG. 2 is a plan view of a microfilm information storage media constructed in accordance with the present invention.
Figure 3:
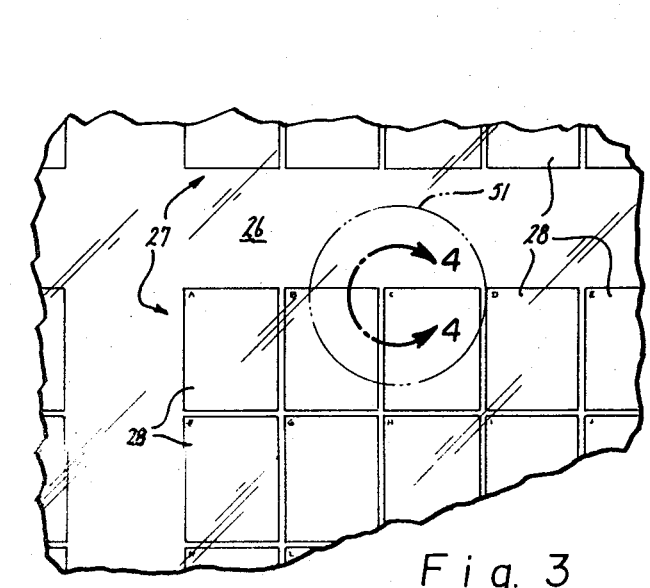
FIG. 3 is a fragmentary enlarged view of that portion of the microfilm indicated in FIG. 2 as the area bounded by line 3—3.

FIG. 2 illustrates a microfilm sheet 26 which acts as a storage medium having characters or pieces of information recorded thereon in fields 27. This may better be seen by reference to FIGS. 3 and 4, which are successive enlarged fragmentary views. In FIG. 3 fields 27 may be seen to be broken down into subfields or smaller divisions of information 28, and each subfield 28 may be seen in FIG. 4 to be comprised of a plurality of numbers 29 and, in some instances, symbols 31. As here illustrated, the microfilm would be commonly referred to as microfiche in light of the relatively high reduction of the information recorded in subfields 28.

Referring again to FIGS. 1 and 2, the use of retrieval card 21 with microfiche sheet 26 can now be explained. In a typical credit card system there are, of course, a very large number of cards in order to accommodate the large number of consumers of the products in connection with which the credit cards are issued. Each card has indicia 23 which are peculiarly related to the individual card in order that the account of that card holder may be segregated from the accounts of all other card holders. In the present system retrieval card 21 is formed with an opening 24 therein. The opening 24 is positioned in the card body at a predetermined location from the peripheral edges 36 and 37 of the card. The location of opening 24 is determined by horizontal dimension A and vertical dimension B, and the dimensions A and B vary throughout the total number of cards in a manner which is related to the specific card and the account against which charges are to be made. As will be explained more fully in detail hereinafter, more than one card may have the same A and B dimensions, although these dimensions will vary considerably when a large number of cards are issued. Thus, in the normal system opening 24 may appear at substantially any position within the area bounded by phantom line 38 in FIG. 1.

Figure 4:
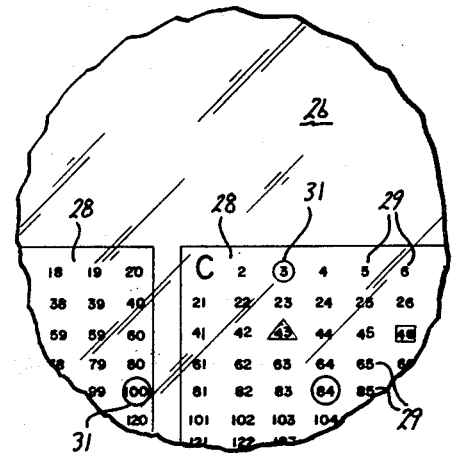
FIG. 4 is a fragmentary enlarged view of that portion of the area of the microfilm indicated in FIG. 3 as the area bounded by line 4—4.

Use of the credit card and microfiche of FIGS. 1–4 can be described as follows. If the credit card is one put out by the oil company, for example, the oil company will prepare the master microfiche sheets 26 on which the numbers and symbols of FIG. 4 are recorded at a very high reduction. Let's assume further that the only information which the oil company wants to keep its dealers appraised of on a current basis is whether or not a card is lost or stolen, if the customer has a very good credit rating and can use this card for purchases in excess of $100, and whether or not the operator should call the central office for further information concerning the card holder. These three conditions are, of course, only exemplary of the types of information which may be retrieved with the system and apparatus of the present invention. Considering FIG. 4 one of the subfields 28 may be seen to have the letter C in its upper left hand corner with numbers 29 being recorded in sequence from left to right in rows of 20 numbers. Each number represents an account in the C subfield. In normal situations most accounts will not be accounts in which cards have been stolen or lost, exceptional credit lines are justified, or a call to the central credit facility is necessary. Accordingly, these accounts merely appear as numbers without any symbols next to them. Accounts numbers 3 and 84, however, have a circular symbol superimposed on them. This will, by way of example, stand for a lost or stolen card. Account number 100 in the B subfield is also circled. Account number 46 in the C subfield has a square superimposed on it, which symbol stands for an instruction to telephone the central credit facility. Account number 43 has a triangle which indicates that credit in excess of $100 may be extended to this account. It is also possible and often advantageous to use color coding in addition to symbols in order to extend the information which can be conveniently stored in the microfiche. Present microfiche printing systems exist which will allow the color printing of master microfiche film.

The microfiche sheet 26 on which the information illustrated in FIG. 4 is recorded is sheet number 5, as may be seen in FIG. 2 in the lower left hand corner of the sheet. Under presently developed techniques for printing microfiche sheets, it is possible to print a sheet or set of sheets having hundreds of thousands of accounts thereon for a fraction of a cent. Accordingly, the oil company would arrange for the printing of microfiche sheets and dissemination of these master sheets to each and every commercial outlet at which its products are sold. The cost of undertaking such a printing and dissemination is very modest by comparison, for example, to the present cost of losses due to an inability to adequately control the use of credit cards at the remote commercial outlets. Accordingly, the gas station dealer would receive a set of master microfiche sheets 26, which as here illustrated would consist of at least five microfiche master sheets. The distributor must further be provided with a magnification apparatus, hereinafter described, in order that the microfiche masters may be read. The credit card company would then issue credit cards having openings 24 therein which are positioned relative to peripheral edges 36 and 37 of the credit card in a predetermined location.

When the customer comes into the commercial outlet to purchase products, the operator of the outlet will take the card 21 for the purpose of determining whether or not credit should be extended. This operation, of course, may also occur after the purchase of products. The operator will then look at the first two numbers in the embossed indicia 23, which are "0.5." This indicates to the operator that sheet number 5 of the master microfiche sheets should be employed. The operator then superimposes the card 21 over the sheet 26 with the peripheral edges 36 and 37 being brought into alignment with peripheral edges 41 and 42 of sheet 26. This step indexes the retrieval card relative to the microfiche sheet 26. The operator then, through the use of the magnification system hereinafter described, observes through opening 24 that portion of the master microfiche sheet number 5 which is circled in FIGS. 2 and 3 as viewing area 51. A portion of viewing area 51 is enlarged and shown substantially as it would be displayed in FIG. 4. The operator then looks at the last set of indicia 23 on the card and sees the letter C and the number 3. This indicates that the operator should look in subfield C at account number 3. Thus, as best seen in FIG. 3, area 51 may include portions of other subfields, such as subfield B and subfield D and may include more than one number 3, the operator can easily refer only to the account in the lettered subfield which appears on the credit card indicia 23. In this instance, account number C 3 is circled indicating that the card is stolen or lost and therefore is being improperly used. The operator should, therefore, not extend credit to this card holder and preferably attempt to obtain the identity of the card holder of the purpose of apprehension. Thus, through the use of the credit card and microfiche system of the present invention a relatively unskilled operator may rapidly retrieve certain limited or symbolic information concerning one of hundreds of thousands of accounts. Moreover, the central credit facility can update the master microfiche cards economically at very short time intervals, for example, a day or less. Still further, the retrieval of selected information from hundreds of thousands of accounts can be accomplished through the use of a simple magnification system.

As will be understood, opening 24 at coordinate position A, B in the credit card will suffice for a substantial number of cards, since the viewing area 51 encompasses a substantial number of numbers in field C. Accordingly, 50 or more cards might have the same A, B coordinates of opening 24 and still allow the readout of information pertaining to the first 50 accounts in subfield C. The size of the opening 24 and the degree of reduction of the microfiche will determine the number of accounts which can conveniently have the same coordinates for opening 24. As illustrated in FIG. 3, field 51 can be seen to be moved to the left of the center of subfield C; however, the area viewed in 51 is still large enough to insure that the first 50 accounts in subfield C will be within area 51. Thus, slight misalignment in the superimposition of card 21 and sheet 26 or the placement of opening 24, will still not result in area 51 being displaced laterally from the desired predetermined position to an extent which will prevent viewing of the desired account number. Accordingly, area 51 is selected to always include the desired account numbers while taking into consideration the normally encountered deviations in alignment of the retrieval card and microfiche and any inaccuracy in the location opening 24.

In order to provide for the retrieval of information from the master microfiche sheets of the present invention, it is quite possible and often desirable to form retrieval card 21 in a number of matters other than that hereinabove described. For example, instead of an opening 24 in card body 21, the area 51 which was defined by opening 24 can be defined by a line or marking 24, such as a light or dark dot or circle. The transparent microfiche sheet 26 is then superimposed over card 21 with the line or circular marking 24 being visible underneath a portion of microfiche sheet 26. Thus, the marking or circular area 51 would be a background defining area 51 in which the operator would look for the appropriate account number. Still further, the marking might be provided in a transparent insert in the card. Thus a transparent insert in card body 22 having a circular line 24 inscribed therein could be used with the card 21 being superimposed over microfiche sheet 26.

As hereinabove described the retrieval card of the present invention has been illustrated as a gasoline credit card. As will be readily understood, the credit card can be used for other merchandise. Moreover, an important additional use of the card might be as an identification card for the purpose of cashing checks. Supermarkets are presently encountering substantial pressure to offer a check cashing service in connection with purchase of their goods. One approach to the rendering of this service has been to have each store keep elaborate files as to the customers in their area and to whom they will extend this check cashing privilege. This requires personnel at each store and does not give the flexibility of a store-to-store check cashing system. Accordingly, an identification card constructed in accordance with the present invention to act as an information retrieval card for master microfiche film sheets could be used in order to determine which customers may cash checks and for what amount they may be cashed.

The retrieval card need not necessarily be in the form of a credit card or similarly shaped identification card. The information retrieval system of the present invention may be advantageously used in such applications as banking systems with the retrieval cards being comprised of the individual's checks. Each check might have an opening or marking physically positioned therein which corresponds to his account, as set forth on a master microfiche sheet. Accordingly, the check itself might be overlayed on a master microfiche sheet prior to cashing. This system might be used at bank branches or even at other commercial establishments which the bank provides with master microfiche sheets.

The remaining indicia 23, namely the numbers "971 8144," can be for use by the card issuing authority or the central credit facility of the organization. If the account has been marked for a call to the central credit facility, as is the case for account number C 46, the central credit facility eight have stored even more detailed information concerning account C 46 on a microfiche sheet of the same general type as sheet 26. Therefore the remaining indicia might be used to enable the central credit facility to go to a specific master microfiche sheet and locate the proper field and subfield without the use of the credit card, which would not be available to the central facility at the time of receiving the phone call. The retail operator upon discovering a signal to call the central facility would do so and indicate the full indicia 23 in order that the central facility might go to its master microfiche sheets and, through the use of the coordinates indicated in indicia 23, extract detailed information concerning the account.

Figure 5:
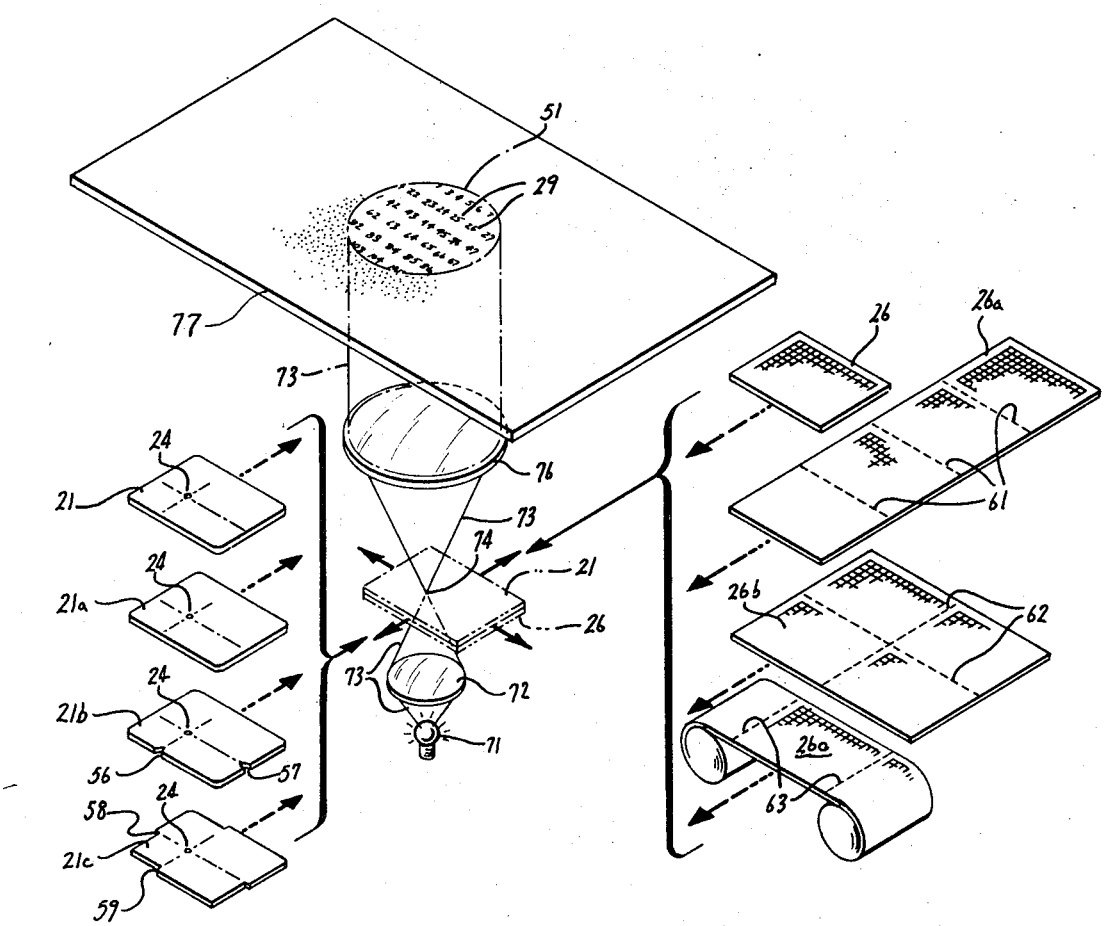
FIG. 5 is a perspective view of a magnification system constructed in accordance with the present invention and illustrating a plurality of retrieval card and storage medium configurations.
Figure 6:
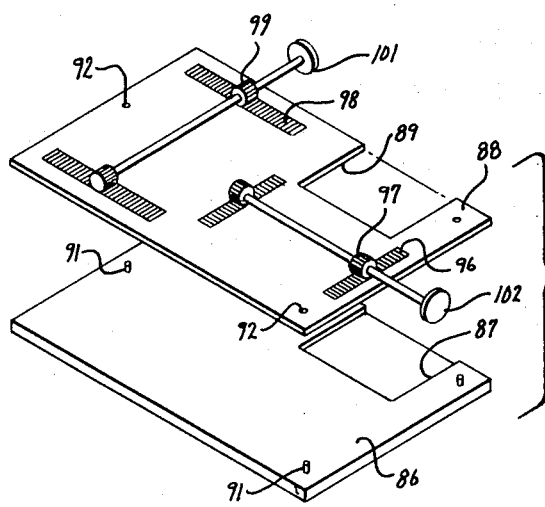
FIG. 6 is a perspective view of an apparatus suitable for use in the manipulation of the retrieval card and storage medium and the magnification apparatus illustrated in FIG. 5.
Figure 1:
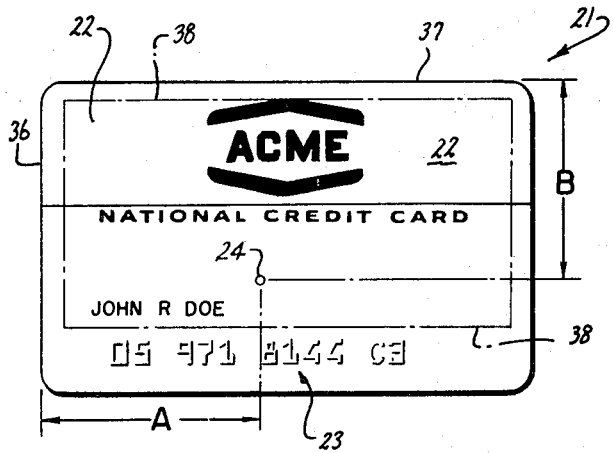
FIG. 1 is a plan view of a credit card constructed in accordance with the present invention to function as an information retrieval card.

Referring now to FIGS. 5 and 6, magnification and card and sheet manipulation apparatus are illustrated, as are further variations of the construction of the retrieval card in microfiche information storage film. In FIG. 5 on the left hand portion of the figures are illustrated four retrieval cards, namely, cards 21, 21a–21c. Cards 21 and 21a are constructed essentially as illustrated in FIG. 1. Cards 21b and 21c illustrate the use of an opening plus notches or other peripheral indentations 56–59. Peripheral notches or indentations 56–59 are useful in aligning the card with the beam of light used in reading the master microfiche sheet, as will be hereinafter set forth.

On the right side of FIG. 5 are four master microfiche sheet constructions designated 26, 26a–26c. Sheet 26 in FIG. 5 corresponds to sheet 26 in FIG. 2. Sheet 26a in FIG. 5 illustrates a construction which is larger than the retrieval card and which has zones or areas defined by dotted lines 61. Thus, the zones or areas defined by the dotted lines are the same size as the sheet 26 and would be identified by a symbol such as numeral 5 in FIG. 2 which could be read by the operator. The operator would then place the retrieval card over that portion of microfiche sheet 26a which corresponded to the number on the retrieval card. Similarly, retrieval card 26b is divided into zones by dotted lines 62. Master microfiche sheet 26c is a continuous roll having card-sized zones defined by dotted lines 63. Each zone in sheets 26b and 26c would similarly be provided with a number or the indicia readable by the operator which would allow the operator to select a portion of the master microfiche sheet over which the card 21 was to be aligned.

In order to provide for alignment or indexing of the retrieval card of the present invention and the master microfiche storage medium, it is possible further to form the cards with indicia, such as lines or openings or notches which correspond to the indicia (such as indicia 61–63), openings or notches formed in the microfilm. For example, each card could be provided with two openings in the upper corners which would allow the card to be placed on two indexing pins (not shown). Thus, similar openings in the microfilm sheet could be provided, and the card and sheet openings, rather than the peripheries of the respective members, could be used as a means of aligning the card and film in relative indexed relation.

In order to allow retrieval of information which is located by means of the retrieval card and master microfiche of the present invention, it is preferable to provide an illumination and magnification system of the general type illustrated in FIG. 5. The illumination system is comprised of a light source 71 and beam focusing lens 72 which causes light beam 73 to be focused substantially at position 74. Card 21 and microfiche 26 are positioned generally at the focal point 74 of beam 73 in order that high intensity beam may pass through openings 24. The beam 73 is then collected by lens 76 and magnified and projected on screen 77, which may be of a standard ground glass construction for viewing from the front side thereof. Thus, area 51 which is defined by opening 24 and includes numerals 29 would be magnified and projected on screen 77 of a sufficient size for viewing without the aid of further mechanical apparatus.

As will be readily understood, other illumination and magnification systems are readily suited to the present invention. It is important to note further, however, that relatively inexpensive lens systems can be employed to illuminate and magnify the microfiche images notwithstanding the very high reduction capability of the microfiche. While such illumination and magnification systems are relatively expensive when in the form of a microfiche reader which illuminates and magnifies an entire page of microfiche (since magnification of an entire page requires that the peripheral edges of the page not be distorted) the present system requires magnification of only a relatively small area of the microfiche, namely area 51. Accordingly, a lens which might cause distortion of the edges of a large area of microfiche is entirely adequate for magnifying a small area of microfiche. It has been found, therefore, that illumination and magnification apparatus costing $20.00 or less per instrument may be entirely satisfactory in magnifying and displaying the area of the microfiche located by the retrieval card.

The illumination and magnification apparatus illustrated in FIG. 5 is designed for use with cards having apertures, openings or transparent sections therein, which will allow the transmission of light through the area of the opening or transparent section. If an outlined or marked area is formed on an opaque portion of the card, an illumination and magnification system must be employed which directs light from the front side of the card rather than from the rear and through the card, as illustrated in FIG. 5. Such illumination systems are readily available.

In order to facilitate the manipulation of the card and microfiche film to a position for projection of the area located by the retrieval card, apparatus of the type in FIG. 6 may be employed. The card and film manipulating device is comprised of a lower member 86 having a recess 87 therein into which a master microfiche film sheet 26 may be positioned. The card 21 may be positioned in upper member 88 in the notched portion thereof. Upper and lower members are held in relative index and alignment by means of pins 91 and openings 92. A card placed in the notched area 89 will be automatically aligned with microfiche film 26 in indexed relation thereto. The rack and pinions 96-99 may be used to move the upper and lower members simultaneously in two directions along the focal plane 74 until opening 24 is in front of the focus beam 73. In order to facilitate this adjustment of the combination of the card and film, notches 56 and 57 may be approximately aligned with the center of beam 73. Similarly, notches 58 and 59 may be used to align opening 24 with beam 73. While the above described card and film manipulating apparatus is advantageous, it has been found that the combination of the card and film can be easily and readily manually oriented in the center of beam 73 if placed upon a transparent table or surface located approximately at the focal point of beam 73.

The pinions 97 and 99 could be mounted for rotation in a support structure which will cause the upper and lower members 88 and 86 to be displaced relative to the support structure in two directions upon rotation of the nobs 101 and 102. Such a support structure could include sleeves which would allow for axial movement of the shafts on which the pinions are mounted in order to accommodate the two way movement.

An important feature of the system and apparatus of the present invention is that it may be readily used with existing credit card systems. Existing credit cards can be easily modified to act as retrieval cards by simply forming an opening therein or providing a marking thereon in some selected predetermined physical location on the card. Moreover, the existing code systems employed by most credit card companies can be the basis for determining the physical location of the information on the microfiche and opening on the card. That is, the coded indicia 23 which presently appears on most credit cards can be the basis for a physical location system of both the opening and microfiche information.

What is claimed is:

1. A method of controlling the use of a multiplicity of credit cards held by a multiplicity of different users comprising the steps of:
   a. preparing a microfiche film with selected credit card identifying indicia photographically recorded thereon and having an indexing means thereon, each of said selected credit card identifying indicia being positioned on said microfiche film in a different area of predetermined known coordinates from said indexing means;
   b. preparing a plurality of copies of said microfiche film and distributing a copy of said microfiche film to each of a plurality of separate credit extension locations;
   c. distributing a credit card to each of said multiplicity of different users at locations remote from said credit extension locations, each said credit card being formed with an indexing means and identifying indicia thereon and each said credit card being further formed with a transparent locator section therein positioned in an area of said card of predetermined known coordinates from said indexing means on said card;
   d. placing any one of said multiplicity of credit cards and a copy of said microfiche film in optically superimposed relation at said credit extension location by positioning said indexing means on said credit card and said indexing means on said microfiche film in fixed predetermined relative position with the coordinates of said transparent locator section determining the area of said microfiche film fixed in optical superimposed relation to said locator section; and
   e. projecting the identifying indicia recorded on said microfiche film in the area optically superimposed with said transparent locator section onto a viewing surface for comparison with identifying indicia on said credit card while said credit card and said microfiche film remain in superimposed relation.

2. A method of controlling the use of credit cards as defined in claim 1 wherein,
   said credit card is placed in superimposed relation over said microfiche film with said identifying indicia facing upwardly for reading of said indicia upon projection of the identifying indicia recorded on said film and located by said transparent locator section.

3. A method of controlling the use of credit cards as defined in claim 1 wherein,
   said multiplicity of credit cards distributed to said users are further formed to be substantially opaque and said transparent section is formed as an opening in said card.

4. A method of controlling the use of credit cards as defined in claim 3 wherein,
   said projecting is achieved by moving the combination of said microfiche film and said credit card, while maintaining said combination in relative fixed relation, to a light source and projection lens, and aligning said opening in said card with said light source for projection of light therethrough and through said microfiche film to said projection lens.

* * * * *